United States Patent
Prock et al.

(10) Patent No.: US 12,108,707 B2
(45) Date of Patent: Oct. 8, 2024

(54) SEED HARVESTER AND RELATED METHODS

(71) Applicants: Bridgestone Corporation, Chuo-ku (JP); Russell E. Prock, Maricopa, AZ (US); David A. Dierig, Phoenix, AZ (US)

(72) Inventors: Russell E. Prock, Maricopa, AZ (US); David A. Dierig, Phoenix, AZ (US)

(73) Assignee: Bridgestone Corporation, Chuo-ku (JP)

( * ) Notice: Subject to any disclaimer, the term of this patent is extended or adjusted under 35 U.S.C. 154(b) by 234 days.

(21) Appl. No.: 17/780,460

(22) PCT Filed: Nov. 27, 2020

(86) PCT No.: PCT/IB2020/001014
§ 371 (c)(1),
(2) Date: May 26, 2022

(87) PCT Pub. No.: WO2021/105766
PCT Pub. Date: Jun. 3, 2021

(65) Prior Publication Data
US 2022/0408647 A1    Dec. 29, 2022

Related U.S. Application Data

(60) Provisional application No. 62/938,439, filed on Nov. 29, 2019.

(51) Int. Cl.
*A01D 45/30*    (2006.01)
(52) U.S. Cl.
CPC .................................. *A01D 45/30* (2013.01)

(58) Field of Classification Search
CPC ..................................................... A01D 45/30
See application file for complete search history.

(56) References Cited

U.S. PATENT DOCUMENTS

| | | | | |
|---|---|---|---|---|
| 1,295,605 A | * | 2/1919 | Sanders | A01D 45/30 460/143 |
| 1,297,349 A | * | 3/1919 | Herr | A01D 45/30 56/128 |

(Continued)

FOREIGN PATENT DOCUMENTS

| | | | | |
|---|---|---|---|---|
| CA | 1166456 A | | 5/1984 | |
| CA | 2340426 A1 | * | 2/2000 | A01F 12/00 |

OTHER PUBLICATIONS

International Search Report and Written Opinion dated May 3, 2021 issued by EPO in connection with corresponding International Application No. PCT/IB2020/001014.

*Primary Examiner* — Arpad Fabian-Kovacs
(74) *Attorney, Agent, or Firm* — Meredith E. Hooker; Matthew P. Dugan

(57) ABSTRACT

A method of harvesting a seed from a rooted plant utilizing a seed harvester. The method includes dislodging the seed from the rooted plant via a seed dislodging system on the seed harvester by contacting the rooted plant with at least one of a plurality of dislodging members of the seed dislodging system. The method also includes collecting the seed via a seed collection system on the seed harvester. The method further includes transporting the seed via a seed transport system on the seed harvester from the seed collection system to a seed isolation system on the seed harvester. The method also includes isolating the seed from a waste material via the seed isolation system. A seed harvester is also included.

20 Claims, 10 Drawing Sheets

(56) References Cited

U.S. PATENT DOCUMENTS

| | | | | |
|---|---|---|---|---|
| 3,276,194 | A * | 10/1966 | Mohn | A01D 46/005 56/330 |
| 4,373,322 | A * | 2/1983 | Beisel | A01D 45/30 56/130 |
| 4,455,814 | A * | 6/1984 | Kienholz | A01D 45/30 56/130 |
| 4,679,386 | A * | 7/1987 | Lundahl | A01D 41/08 460/123 |
| 5,323,594 | A * | 6/1994 | Whitney | A01D 45/30 56/16.6 |
| 5,381,646 | A * | 1/1995 | Casey | A01D 45/30 56/15.8 |
| 9,497,902 | B2 * | 11/2016 | Marrs | A01D 46/26 |
| 9,888,629 | B2 * | 2/2018 | Williamson | A01D 46/264 |
| 2002/0004418 | A1 * | 1/2002 | Mesquita | A01D 89/001 460/115 |
| 2013/0263563 | A1 | 10/2013 | Moreira et al. | |

* cited by examiner

SEED HARVESTER AND RELATED METHODS

This application is the National Stage of International Application No. PCT/IB2020/001014, filed on Nov. 27, 2020, which claims the benefit of priority from U.S. Provisional Patent Application No. 62/938,439, filed on Nov. 29, 2019, the entire contents of which is hereby incorporated herein by reference.

FIELD OF THE DISCLOSURE

The present disclosure relates, generally, to seed harvester machines and, in particular, to seed harvesting machines for removing and collecting seeds from a plant.

BACKGROUND OF THE DISCLOSURE

Harvesting seeds from plants is desirable for use in research and future plantings. In certain instances, it is advantageous that the seeds, and not the plants, are collected while leaving the plants intact and unharmed for further growth and eventual harvesting. To prevent damage to the plant and breakage of stems, branches, and leaves, manual harvesting of seeds is often utilized to ensure plants are handled gently. Manual harvesting is time consuming, expensive and limited to suitable working conditions and labor availability.

One plant that may benefit from improved harvesting techniques is the guayule plant. The guayule plant (*Parthenium argentatum*) is a shrub-like plant that contains rubber. Guayule plants are generally planted in soil, frequently in rows, and may be grown for a period prior to harvesting. The guayule plants may contain a number of seeds dispersed throughout the plant which may be harvested and planted to grow additional guayule plants, thereby increasing the amount of rubber that can be produced. Conventionally, due to the tender nature of the underlying plant, guayule seeds have been manually harvested, however, as stated above, manual harvesting can be time-consuming and labor intensive. Accordingly, it would be beneficial if a system existed which would allow guayule seeds, or other seeds, to be harvested efficiently without damaging the underlying plant.

SUMMARY OF THE DISCLOSURE

One example of a method of harvesting a seed from a plant in accordance with the subject matter of the present disclosure includes utilizing a seed harvester to dislodge the seed from the plant via a seed dislodging system by contacting the plant with a dislodging member. The method can also include collecting the seed via a seed collection system on the seed harvester. The method can further include transporting the seed via a seed transport system on the seed harvester from the seed collection system to a seed isolation system on the seed harvester. The method can also include isolating the seed from a waste material via the seed isolation system, In various embodiments, dislodging the seed may comprise contacting the plant with the plurality of dislodging members, thereby causing the seed to fall from the plant via force of gravity to the seed collection system. The seed collection system may comprise a collection reservoir comprising an elongated channel beneath the plurality of dislodging members. The seed transport system may comprise a blower configured to move the seed toward a rear portion of the collection reservoir. The seed transport system may further comprise a feed duct configured to receive the seed from the collection reservoir and transport the seed to the seed isolation system. The seed isolation system may comprise a tumbler comprising a separator surface and an opening, the seed configured to exit through the separator surface and the waste material configured to exit through the opening.

A header for a seed harvester may comprise a first dislodging member, a first sidewall, a second dislodging member, a second sidewall opposite the first sidewall and a collection reservoir beneath at least one of the first sidewall and the second sidewall. The first sidewall and the second sidewall define a pass-through opening configured to receive a plant.

In various embodiments, the first member and the second dislodging member extend inwardly from the first and second sidewalls, respectively. The first and second dislodging members may comprise flexible bristles configured to contact the plant and dislodge a seed from the plant. The collection reservoir may comprise a substantially U-shaped elongated channel configured to receive a dislodged seed. The header may be configured to be rotatably mounted to a front end of the seed harvester via a header mount such that the header can be selectively rotated about the header mount. The header may further comprise a guide wheel extending from beneath the header and configured to support the header. The header may further comprise a guide wedge configured to guide the plant into the pass-through opening. The collection reservoir may further comprise a blower coupled at least one of the first sidewall and the second sidewall with the blower configured to move a seed to a rear portion of the collection reservoir.

A seed harvester may comprise a seed dislodging system configured to dislodge a seed from a plant and a seed collection system situated beneath the seed dislodging system configured to collect the seed dislodged from the plant via the seed dislodging system. The seed dislodging system and the seed collection system can comprise a plurality of headers coupled to a front of the seed harvester.

In various embodiments, the plurality of headers comprise a first dislodging member, a first sidewall, a second dislodging member, a second sidewall opposite the first sidewall, and a collection reservoir coupled to at least one of the first sidewall and the second sidewall. The seed harvester may further comprise a seed transport system configured to transport the seed to a seed isolation system configured to isolate the seed from a waste material. The seed transport system may comprise a blower coupled to one of the first sidewall and the second sidewall and configured to move the seed to a rear portion of the collection reservoir and a feed duct configured to receive the seed from the collection reservoir and transport the seed to the seed isolation system. The seed harvester may further comprise a pump duct coupled to the feed duct and configured to assist in transporting the seed to the seed isolation system utilizing a positive pressure source. The positive pressure source may be a fan of an engine on the seed harvester.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Turning now to the drawings, it is to be understood that the showings are for purposes of illustrating examples of the subject matter of the present disclosure and that the same are not intended to be limiting. Additionally, it will be appreciated that the drawings are not to scale and that portions of certain features and/or elements may be exaggerated for purpose of clarity and/or ease of understanding.

The present disclosure refers to and describes systems and methods of harvesting one or more seeds from a plant utilizing a seed harvester. In particular, the subject systems and methods can find application and use in harvesting seeds from plants that are living and rooted both before and after the seeds are harvested, such as during a first-year of a multi-year growth cycle, for example. It should be appreciated that the broader process steps described herein may be accomplished by a variety of equipment configurations and sub-process steps, each of which are within the scope of the present invention. For example, the following disclosure describes harvesting seeds from living, rooted guayule plants. Particular equipment is generally described as being suitable for such guayule seed harvesting. However, other equipment may be implemented to accomplish the function of harvesting guayule seeds described herein. Additionally or alternatively, the present system and method may be implemented and/or adapted to harvest other types of seeds and/or be used in connection with plants other than guayule.

In accordance with various embodiments of the present disclosure, a seed harvester may be utilized to decrease the amount of time it takes to harvest seeds from a plant, such as guayule, without damaging the underlying plant, which may remain living and rooted after the seeds have been harvested. Such a seed harvester may generally comprise a plurality of headers mounted to a frame and configured to receive a plurality of plants as the seed harvester traverses a field of one or more rows of living, rooted plants. The headers may be fitted with one or more seed dislodging members configured to nondestructively dislodge seeds from the plants. The seeds, once dislodged, may generally be collected via a collection reservoir and transported to a tumbler where the seeds may be separated from waste (i.e., leaves, stems, branches, debris) collected during the harvesting process. As such, various embodiments of the present disclosure may be more efficient and less labor intensive in harvesting guayule seeds than traditional manual harvesting techniques. Further, various embodiments of the present disclosure may be configured to harvest seeds in a nondestructive manner with minimal damage to the underlying plant, which may remain living and rooted after the seeds have been harvested.

Figure 1:
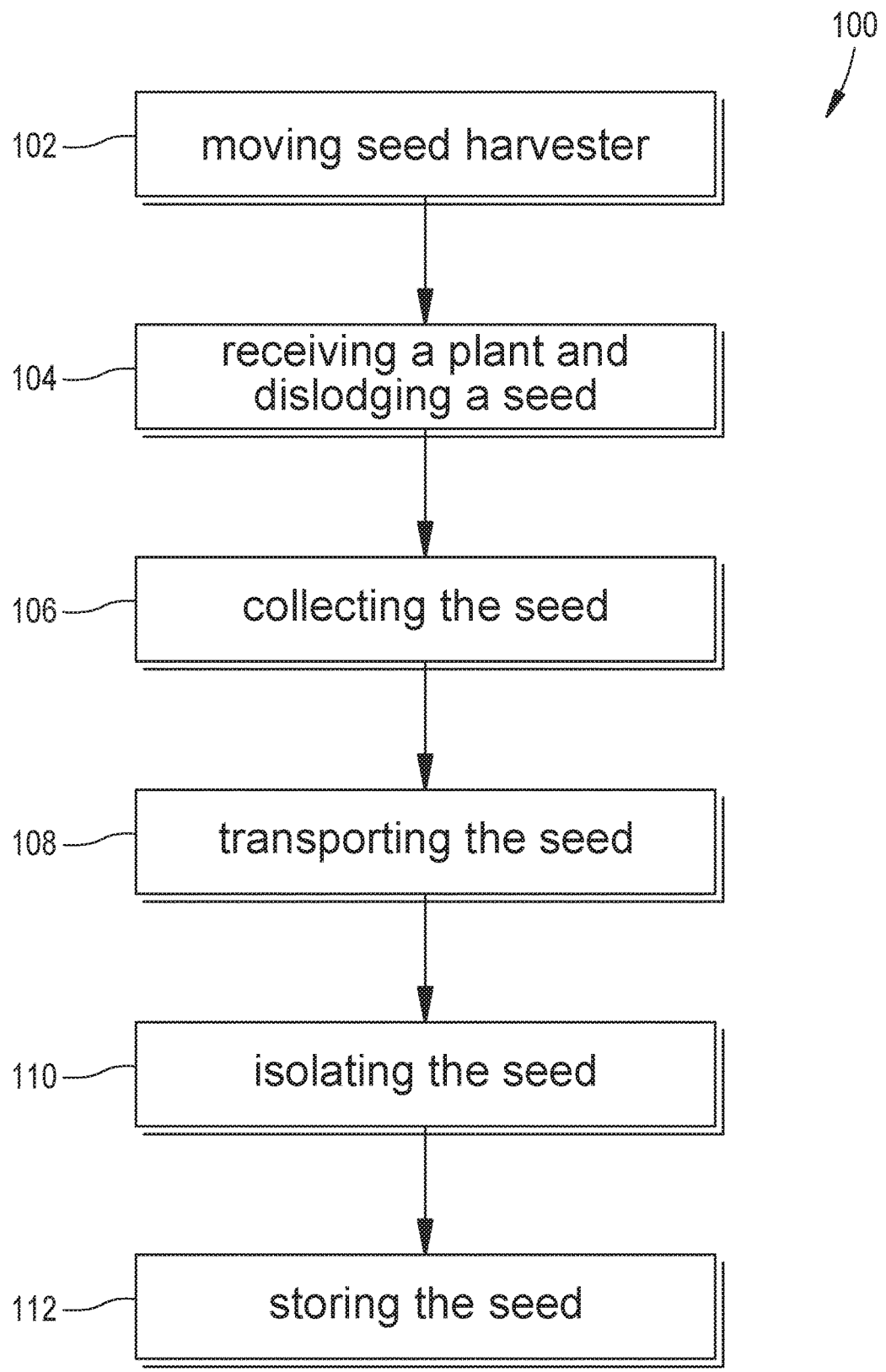
FIG. 1 is a diagram illustrating an exemplary method of harvesting a seed from a plant utilizing a seed harvester in accordance with various embodiments of the present disclosure.

Accordingly, in accordance with various embodiments and with reference to FIG. 1, a method 100 for harvesting a seed from a plant utilizing a seed harvester is illustrated. The method steps are illustrated in block-diagram format to re-emphasize that the seed harvester is not limited to any specific structure, however, exemplary embodiments will be discussed further below with reference to FIGS. 2, 3, 3A, 4-6, 6A, 7 and 8. Generally, method 100 may comprise moving a seed harvester comprising a seed dislodging system, a seed collection system, a seed transport system, and a seed isolation system through a field of plants (step 102). The method may comprise receiving, via the seed dislodging system, a plant and dislodging a seed from the plant (step 104), which may remain living and rooted after the seeds have been harvested. The method may comprise collecting, via the seed collection system, the seed from the seed dislodging system (step 106). The method may comprise transporting, via the seed transport system, the seed from the seed collection system to the seed isolation system (step 108). The method may comprise isolating, via the seed isolation system, the seed from a waste material gathered while dislodging the seed from the plant (step 110). The method may further comprise storing the seed, such as in a holding container, such that a plurality of seeds are at least temporarily stored on the seed harvester during use and operation thereof (step 112).

Figure 2:
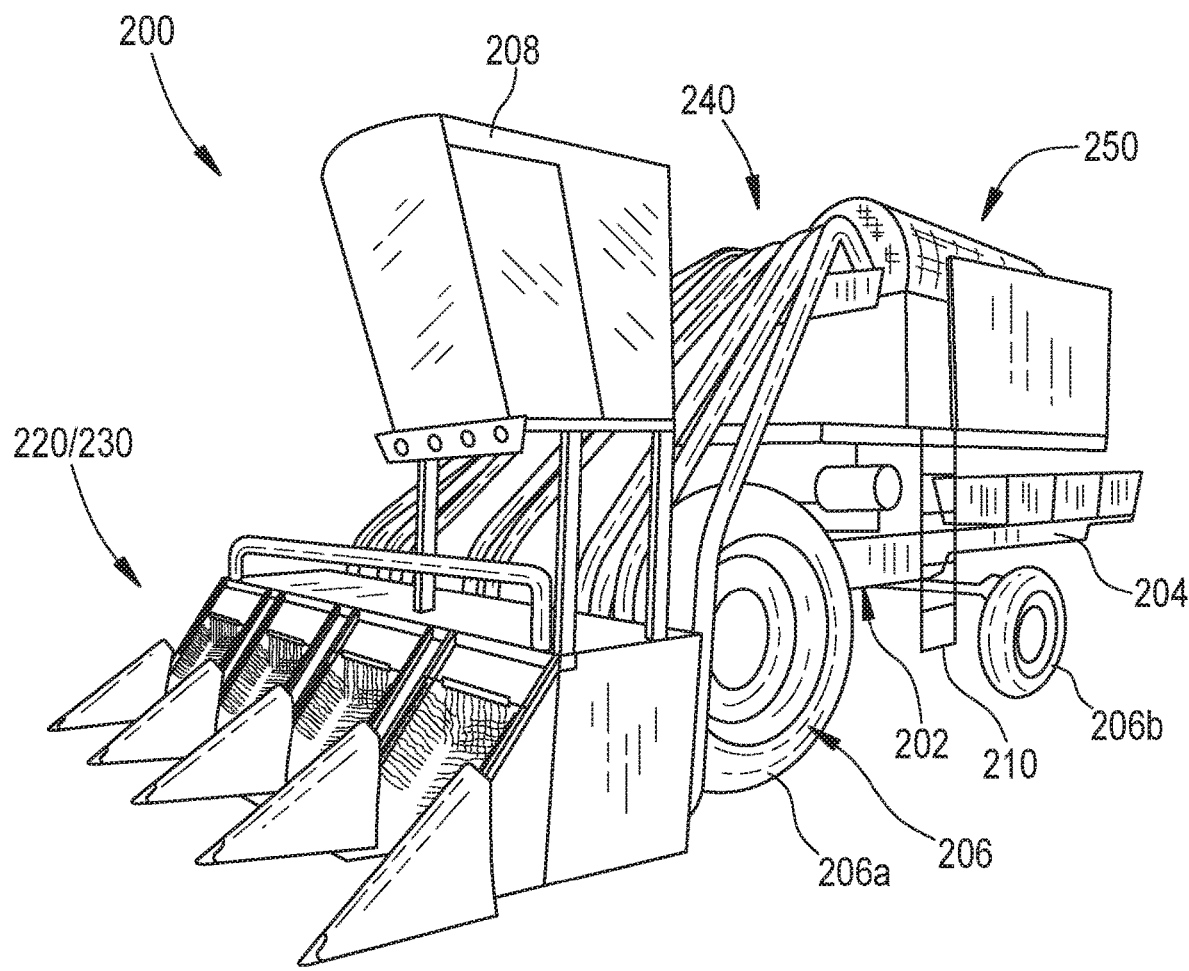
FIG. 2 is a front perspective view of one example of a seed harvester with a plurality of seed harvesting headers of one exemplary construction in accordance with various embodiments of the present disclosure.

Referring to FIG. 2, an exemplary seed harvester 200 is illustrated from a front perspective view in accordance with various embodiments. Seed harvester 200 may generally comprise a vehicle configured to be driven through a field comprising rows of plants, such as guayule plants, and be used to harvest seeds from the plants, which may remain living and rooted after the seeds have been harvested. In various embodiments, seed harvester 200 may comprise a seed harvester body 202 comprising a chassis 204 comprising a plurality of wheels 206. Chassis 204 may comprise a powertrain comprising an engine configured to generate power and a drivetrain configured deliver power to one or more of wheels 206 to propel seed harvester 200. Seed harvester 200 may be configured to travel at a speed of approximately 0 to 15 mph, or more specifically, approximately 13.4 mph, to and from a field and at a speed of approximately 0 to 5 mph, or more specifically, approximately 3.2 mph through a field while harvesting.

In various embodiments, the plurality of wheels 206 may comprise two front wheels 206a and two rear wheels 206b. In various embodiments, two front wheels 206a may comprise dimensions larger than two rear wheels 206b. For example, two front wheels 206a may comprise a diameter of approximately 46" and a width of approximately 13.6", while two rear wheels 206b may comprise a diameter of approximately 24" and a width of approximately 9". Such a configuration may allow seed harvester 200 to harvest rows of living, rooted plants comprising a width of 160" and a height of 30", while allowing seed harvester 200 to move between rows of plants without damaging the plants. For example, in various embodiments, plants may be planted in a field approximately 38 inches to approximately 40 inches apart. As such, front wheels 206a may be spaced apart from one another and/or rear wheels 206b may be spaced apart from one another such that the wheels may fit between the rows or beds of plants. Further, the larger dimensions of two front wheels 206a may provide adequate support for the front end of the seed harvester, which may generally comprise a weight greater than a rear portion of the seed harvester. While discussed herein as comprising two front wheels 206a and two rear wheels 206b, seed harvester 200 is not limited in this regard and may comprise any other transportation system capable of moving seed harvester 200 to, from, and throughout a field to harvest seeds.

In various embodiments, an operator may sit within a cabin 208, which may function similar to a cabin in other vehicles, in order to provide shelter for an operator operating seed harvester 200. Cabin 208 may comprise a seat, steering wheel, and other controls configured to communicate instructions to various systems of seed harvester 200 during operation. For example, cabin 208 may comprise one or more controls configured to operate a throttle to control a speed of seed harvester 200, one or more controls configured to operate a seed dislodging system, a seed collection system, a seed transport system, and/or a seed isolation system. As would be appreciated, cabin 208 may further comprise controls for various other systems of seed harvester 200, for example, external and internal lighting systems, air conditioning, etc. All of such controls as well as any systems and/or devices thereof are collectively represented in FIGS. 3 and 3A by dashed box CTL. In various embodiments, seed harvester 200 may comprise a ladder 210 coupled to one side of cabin 208 and configured to allow an operator to enter and exit cabin 208.

As previously discussed with reference to FIG. 1 and method 100, in accordance with various embodiments, seed harvester 200 may generally comprise one or more seed dislodging systems 220, one or more seed collection systems 230, one or more seed transport systems 240, and/or one or more seed isolation systems 250. Seed dislodging system 220 may comprise any suitable system configured to receive plants and nondestructively dislodge seeds from the plant which may remain living and rooted after the seeds have been harvested. Seed collection system 230 may comprise any system configured to collect dislodged seeds from seed dislodging system 220. Seed transport system 240 may comprise any system configured to transport seeds from seed collection system 230 to seed isolation system 250. Seed isolation system 250 may generally comprise any suitable system configured to separate seeds from a waste material collected during the harvesting process. Accordingly, while discussed herein with reference to specific embodiments comprising specific structural elements, seed harvester 200 is not limited in this regard and may comprise any system capable of dislodging, collecting, transporting, and isolating seeds during a harvesting process.

Figure 3:
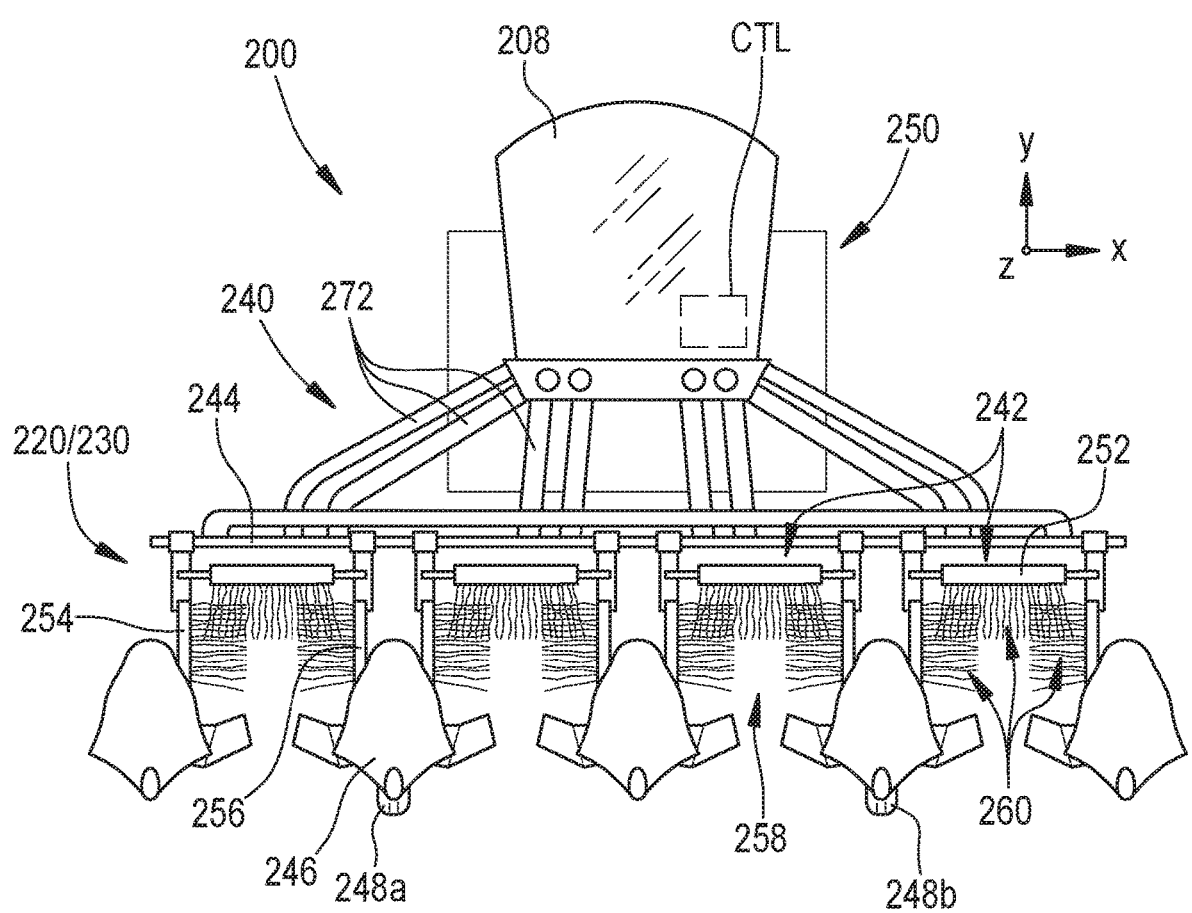
FIG. 3 is a front view of the exemplary seed harvester in FIG. 2.
Figure 3A:
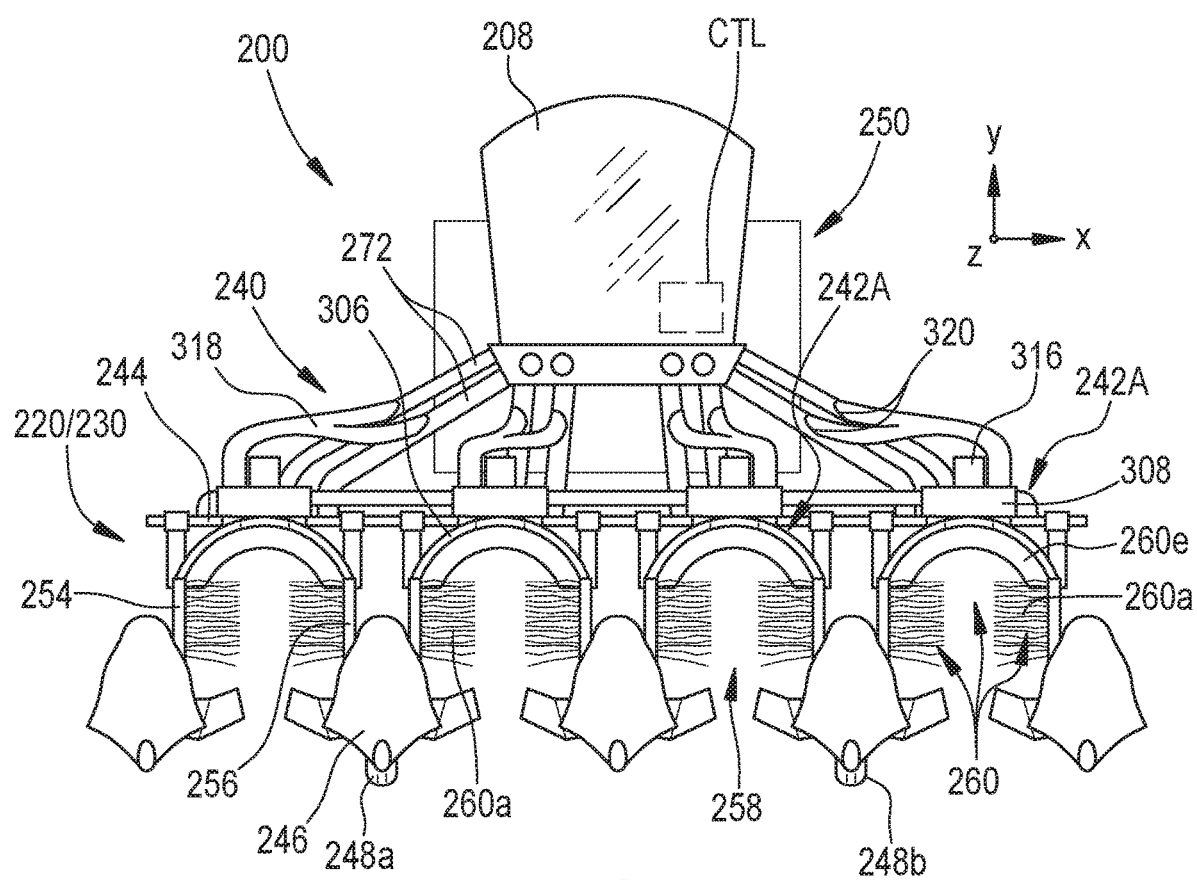
FIG. 3A is a front view of the exemplary seed harvester in FIGS. 2 and 3 with a plurality of seed harvesting headers of an alternate exemplary construction in accordance with various embodiments of the present disclosure.

In accordance with various embodiments and with reference to FIGS. 3 and 3A, seed harvester 200 is illustrated from a front view. Seed dislodging system 220 and seed collection system 230 may generally comprise a plurality of headers 242 and/or 242A. It will be recognized and appreciated that any combination of one or more of headers 242 and/or one or more of headers 242A can be included. As non-limiting examples, all of the plurality of headers can be configured as headers 242, or all of the plurality of headers can be configured as headers 242A, or one or more of the plurality of headers can be configured as headers 242 and one or more of the plurality of headers can be configured as headers 242A. Regardless of the arrangement and/or combination of headers that are included, the plurality of headers can be rotatably mounted to a front frame of seed harvester 200 via a header mount 244. For example, headers 242 and/or 242A may be actuated upwards or downwards (about the x-axis) depending on a desired condition of the seed harvester. More specifically, as seed harvester 200 moves to and from a field of plants, headers 242 and/or 242A may be actuated or otherwise positioned in an upwards orientation (for example, rotated about the x-axis away from a ground surface) to avoid contacting the ground surface, and may be actuated or otherwise positioned in a downwards orientation (for example, rotated about the x-axis toward the ground surface) to properly align with plants for harvesting. While discussed herein as comprising rotational actuation capability, seed harvester 200 is not limited in this regard and may comprise additional actuation capabilities, such as translation perpendicular (along the y-axis) and/or parallel to the ground surface (along the x-axis).

In accordance with various embodiments, headers 242 and/or 242A may be separated by a plurality of guide wedges 246 that may be generally configured to separate rows of plants as seed harvester 200 moves through the field and guide the rows of plants into different ones of the plurality of headers 242 and/or 242A. Guide wedges 246 may generally comprise a padded material such as a foam, rubber material, or polyethylene material such that damage to the plants is limited, minimized or otherwise at least reduced as the plants are contacted by the plurality of guide wedges 246. While illustrated as comprising a triangular prism geometry, guide wedges 246 are not limited in this regard and may comprise any suitable shape for nondestructively guiding rows of plants into plurality of headers 242 and/or 242A.

In various embodiments, one or more guide wheels may be coupled to and extend from a bottom of the plurality of headers 242 and/or 242A. For example, as illustrated in FIGS. 3 and 3A, a first guide wheel 248a and a second guide wheel 248b may support a portion of the weight of headers 242 and/or 242A and prevent the plurality of headers from contacting the ground surface as seed harvester 200 moves. In various embodiments, first guide wheel 248a and second guide wheel 248b may be substantially aligned with two front wheels 206a and/or two rear wheels 206b (with momentary reference to FIG. 2). As such, similar to two front wheels 206a and two rear wheels 206b, first guide wheel 246a and second guide wheel 246b may travel between rows of plants rather than traveling in-line with the rows of plants. In various embodiments, two front wheels 206a, two rear wheels 206b, first guide wheel 248a, and second guide wheel 248b may be separated by a distance of approximately 0 to 160", preferably approximately 40 to 120", or more preferably approximately 80" to allow seed harvester 200 to move through a field without damaging plants. However, two front wheels 206a, two rear wheels 206b, first guide wheel 248a, and second guide wheel 248b are not limited in this regard and may be separated more or less depending on a particular application, size of the plants, and/or spacing of rows.

In various embodiments, first guide wheel 248a and second guide wheel 248b may be able to adjust the distance headers 242 and/or 242A is positioned relative to the ground surface. For example, in various embodiments, first guide wheel 248a and second guide wheel 248b may be equipped with a hydraulic system configured to raise and or lower the plurality of headers 242 and/or 242A. In some instances, it may be desirable to align the plurality of headers with a bottom portion of the plant (leaves but not stem) in order to reduce the likelihood one or more seeds will lost during the dislodging process. Accordingly, first guide wheel 248a and second guide wheel 248b may be configured to adjust the plurality of headers depending on the distance a given plant is positioned above the ground surface.

Plurality of headers 242 and/or 242A may comprise any number and orientation of headers configured to receive a corresponding number of rows of plants. As previously stated, plurality of headers 242 and/or 242A may be configured to dislodge seeds from the plants and collect the seeds before the seeds are transported via seed transport system 240 to seed isolation system 250. While illustrated as comprising four headers oriented side-by-side, plurality of headers 242 and/or 242A is not limited in this regard and may comprise more or less headers oriented in an alternative manner depending on the application. As seed harvester 200 moves through a field of plants, headers 242 and/or 242A may align with a corresponding number of rows of plants, which may "pass-through" the headers as seed harvester 200 moves through the field.

In accordance with various embodiments, each header in plurality of headers 242 and/or 242A may comprise a top support 252, a first sidewall 254, and a second sidewall 256 opposite first sidewall 254. Together, top support 252, first sidewall 254, and second sidewall 256 may define a pass-through opening 258. Pass-through opening 258 may be configured to receive a row of plants as seed harvester 200 moves through the field. In accordance with various embodiments, a plurality of dislodging members 260 may extend inwardly toward a center of pass-through opening 258 from along top support 252, first sidewall 254, and/or second sidewall 256. Dislodging members 260 may be configured to brush against a plant, thereby dislodging seeds from the plant in a nondestructive manner. In various embodiments, dislodging members 260 may comprise any suitable structure and/or material that is capable of dislodging seeds from a plant, while not likely to cause destruction of substantial damage or injury to the plant as the plant moves through pass-through opening 258. In some cases, dislodging members 260 may generally form a substantially square-shaped window with each side of the square-shaped window comprising a length within a range of approximately 1 to 16 inches, or preferably within a range of approximately 4 to 12 inches, or more preferably a length of approximately 8 inches.

In various embodiments, dislodging members 260 may comprise bristles comprising a polymer material such as nylon, polyester, polyethylene, polypropylene, polystyrene, polyvinyl chloride (PVC), animal hair such as goat hair, hog bristle, horsehair, or any other synthetic or natural material capable of dislodging seeds with minimal damage to the underlying plant. In various embodiments, dislodging members 260 may comprise a rake-like structure or other suitable structure. Dislodging members 260 may comprise any suitable thickness and/or length and may comprise uniform dimensions or varying dimensions. For example, in various embodiments dislodging members may comprise any length suitably configured to dislodge seeds from the plant without damaging the underlying plant. In various embodiments, dislodging members 260 may comprise a length within a range of approximately 1 to 20 inches, or preferably within a range of approximately 5 to 15 inches, or more preferably approximately 10 inches. Dislodging members 260 can, in some cases, have a circular cross-sectional shape with a diameter within a range of approximately 0.01 to 1 inch, or more preferably approximately 0.5 inches. In various embodiments, dislodging members 260 be substantially straight or may be curved. Dislodging members 260 can be angled, textured, grouped and/or spaced in any suitable manner.

While illustrated as static herein, dislodging members 260 may be dynamic. For example, dislodging members 260 may be configured to vibrate, oscillate, or rotate in any manner to efficiently dislodge seeds from the plant. In various embodiments, dislodging members 260 may be coupled to top support 252, first sidewall 254, and/or second sidewall 256 such that dislodging members 260 move inward (thereby decreasing the area of pass-through opening 258) and/or move outward (thereby increasing the area of pass-through opening 258), such as in response to the size of the plant from which seeds are being harvested, for example. Top support 252, first sidewall 254, and/or second sidewall 256 may be configured to move in any manner. For example, in various embodiments, top support 252 may be configured to move toward or away from a ground surface to adjust to a height of a given plant. Numerous embodiments are contemplated herein.

Figure 4:
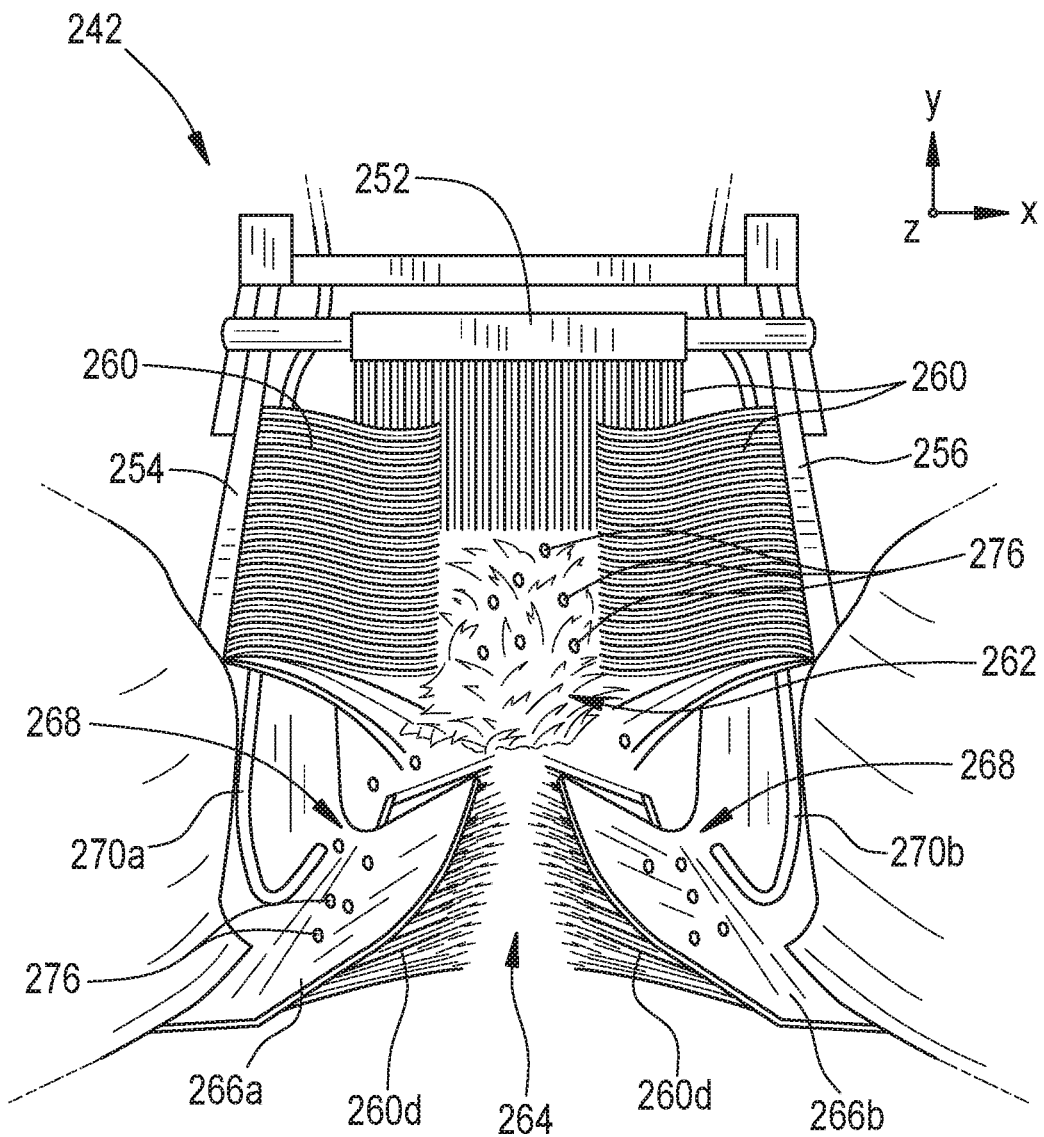
FIG. 4 is an enlarged front view of one exemplary header of the exemplary seed harvester in FIGS. 2 and 3.

Referring to FIGS. 3 and 4, an exemplary header of plurality of headers 242 is illustrated in accordance with various embodiments. Dislodging members 260 may extend inwardly from top support 252, first sidewall 254, and/or second sidewall 256. As a plant 262 (or a plurality of plants in a row) moves through pass-through opening 258, dislodging members 260 may contact the plant. Dislodging members 260 may contact seeds, stems, leaves, branches or other portions of plant 262 with a force sufficient to cause the seeds to fall from the plant with, in some cases, the plant remaining living and rooted before and after the seeds are harvested therefrom.

Figure 5:
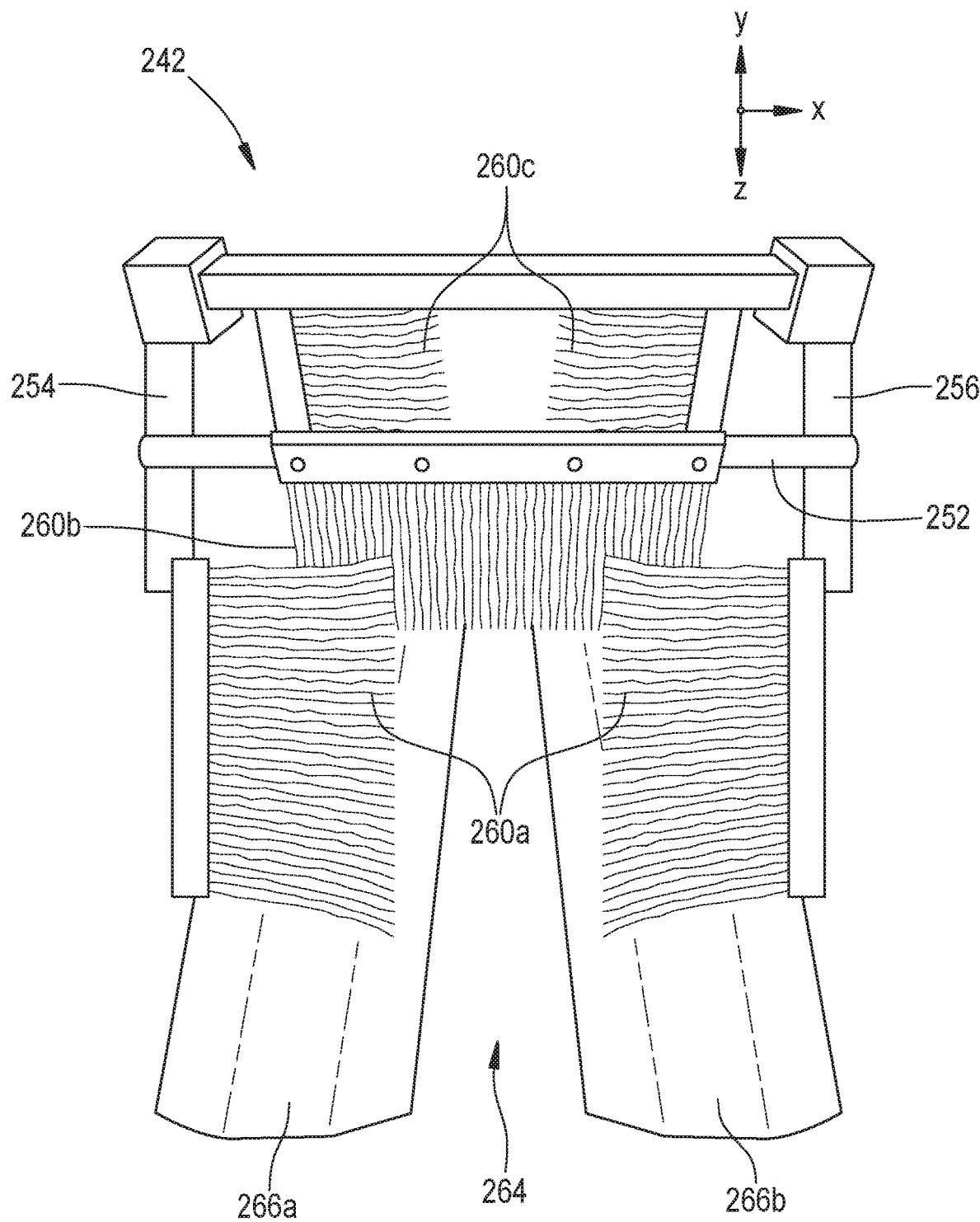
FIG. 5 is a front perspective view of the exemplary header in FIGS. 2-4.

In accordance with various embodiments and referring to FIGS. 3-5, dislodging members 260 may be arranged in any desired manner. For example, referring specifically to FIG. 4, dislodging members 260 may be arranged such that the dislodging members extending from first sidewall 254 and second sidewall 256 are positioned in front of the dislodging members extending from top support 252. Stated otherwise, plant 262 may be contacted by dislodging members 260 coupled to first sidewall 254 and second sidewall 256 before being contacted by dislodging members 260 coupled to top support 252. Such a configuration will ensure that seeds on top of the plant are not dislodged too soon, thereby getting caught in the plant rather than falling into seed collection system 230.

With further reference to FIGS. 3-5, multiple sets of dislodging members 260 may be utilized. For example, in various embodiments, a given header in plurality of headers 242 and/or 242A may comprise dislodging members 260a extending from first sidewall 254 and second sidewall 256. Additionally, or in the alternative, dislodging members 260b can, optionally, extend from top support 252. Furthermore, or as a further alternative, dislodging members 260c can, optionally, first sidewall 254 and second sidewall 256. Additional dislodging members and/or dislodging members having other mounting arrangements may also or alternatively be utilized, such as is described hereinafter, for example.

In some cases, the various dislodging members may be staggered. For example, with reference to FIG. 5, dislodging members 260c extending from first sidewall 254 and second sidewall 256 may be raised from a ground surface (in the positive y-axis direction) more than dislodging members 260a extending from first sidewall 254 and second sidewall 256. If included, dislodging members 260b extending from top support 252 may be situated above dislodging members 260a yet below dislodging members 260c, if included. In such a way, the surface area occupied by the dislodging members may be increased to increase the likelihood seeds become dislodged. Further, while illustrated in the specific configurations of FIG. 4 and FIG. 5, dislodging members 260 of headers 242 and/or 242A are not limited in this regard and may be configured in numerous other manners.

With continued reference to FIG. 4 and FIG. 5, a stem of the plant may pass through a slot 264 formed between one or more collection reservoirs. For example, each header may comprise a first collection reservoir 266a and a second collection reservoir 266b opposite first collection reservoir 266a. In various embodiments, seed harvester 200 may comprise eight collection reservoirs with each header in the plurality of headers 242 and/or 242A comprising two collection reservoirs. However, seed harvester 200 is not limited in this regard and may comprise any desired number of collection reservoirs depending on the number of headers and other factors. Together, first collection reservoir 266a and second collection reservoir 266b may form seed collection system 230. While illustrated as comprising substantially U-shaped elongated channels formed in a forward to aft direction (along the z-axis), first collection reservoir 266a and second collection reservoir 266b are not limited in this regard and may comprise any suitable structure configured to collect seeds as they are dislodged from the plant.

First collection reservoir 266a and second collection reservoir 266b may comprise a flexible material. For example, due to the differing diameters of plant stems, first collection reservoir 266a and second collection reservoir 266b may be configured to flex inwardly in response to contacting a stem of a plant in order to prevent damage to the plant. Accordingly, in various embodiments, first collection reservoir 266a and second collection reservoir 266b may comprise an elastomeric material such as a rubber material. A plurality of upward-angled dislodging members 260d (FIG. 4) may be coupled beneath first collection reservoir 266a and second collection reservoir 266b and be configured to dislodge seeds from the bottom of plants passing through a given header.

In various embodiments, each header in plurality of headers 242 and/or 242A may comprise one or more blowers configured to move collected seeds toward a rear portion 268 of each collection reservoir. For example, each header in the plurality of headers may comprise a first blower 270a and a second blower 270b, which may form a portion of seed transport system 240. First blower 270a and second blower 270b may be clamped, fastened, tied, glued, or otherwise secured to first sidewall 254 and second sidewall 256, respectively, and be configured to deliver pressurized gas to collected seeds in the collection reservoir. In various embodiments, the blowers may comprise a PVC, polyurethane, polyethylene, or rubber tubing and generally be oriented toward rear portion 268 of the collection reservoir. Pressurized gas may be delivered to first blower 270a and second blower 270b via a pressurized gas source located on seed harvester 200, which in various embodiments may be a fan from the engine on seed harvester 200. In various embodiments, first blower 270a and second blower 270b may apply pressurized gas to collected seeds at a flow rate within a range of between approximately 0 to 70 ft$^3$/min, or preferably within a range of approximately 15 to 55 ft$^3$/min, or more preferably approximately 35 ft$^3$/min. Such a pressurized gas flow may be sufficient to move collected seeds toward rear portion 268 of the collection reservoir, yet not too great such that collected seeds are blown out of the collection reservoir.

Figure 6:
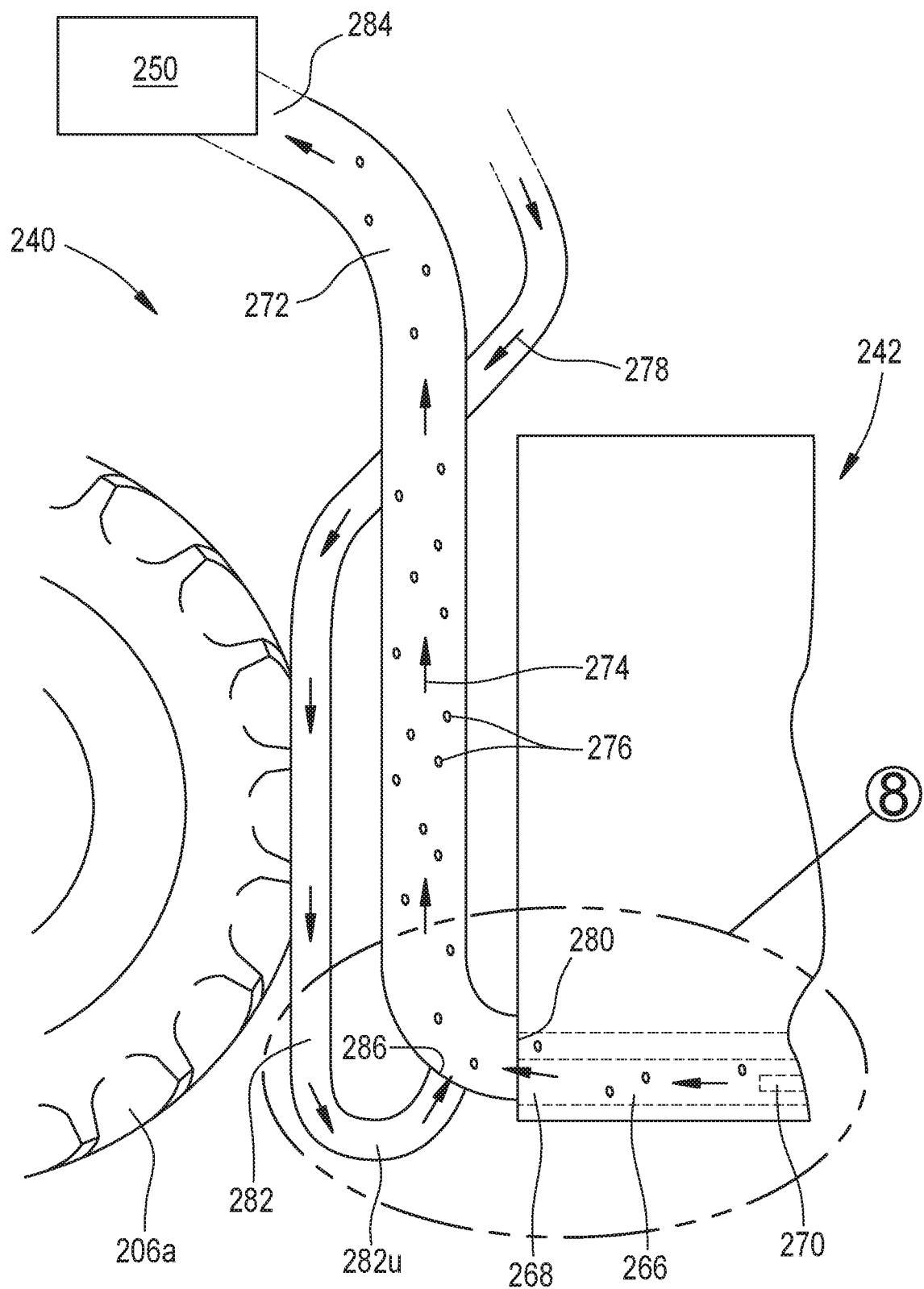
FIG. 6 is a side view of one example of a seed transport system of the exemplary seed harvester in FIGS. 2-5.
Figure 6A:
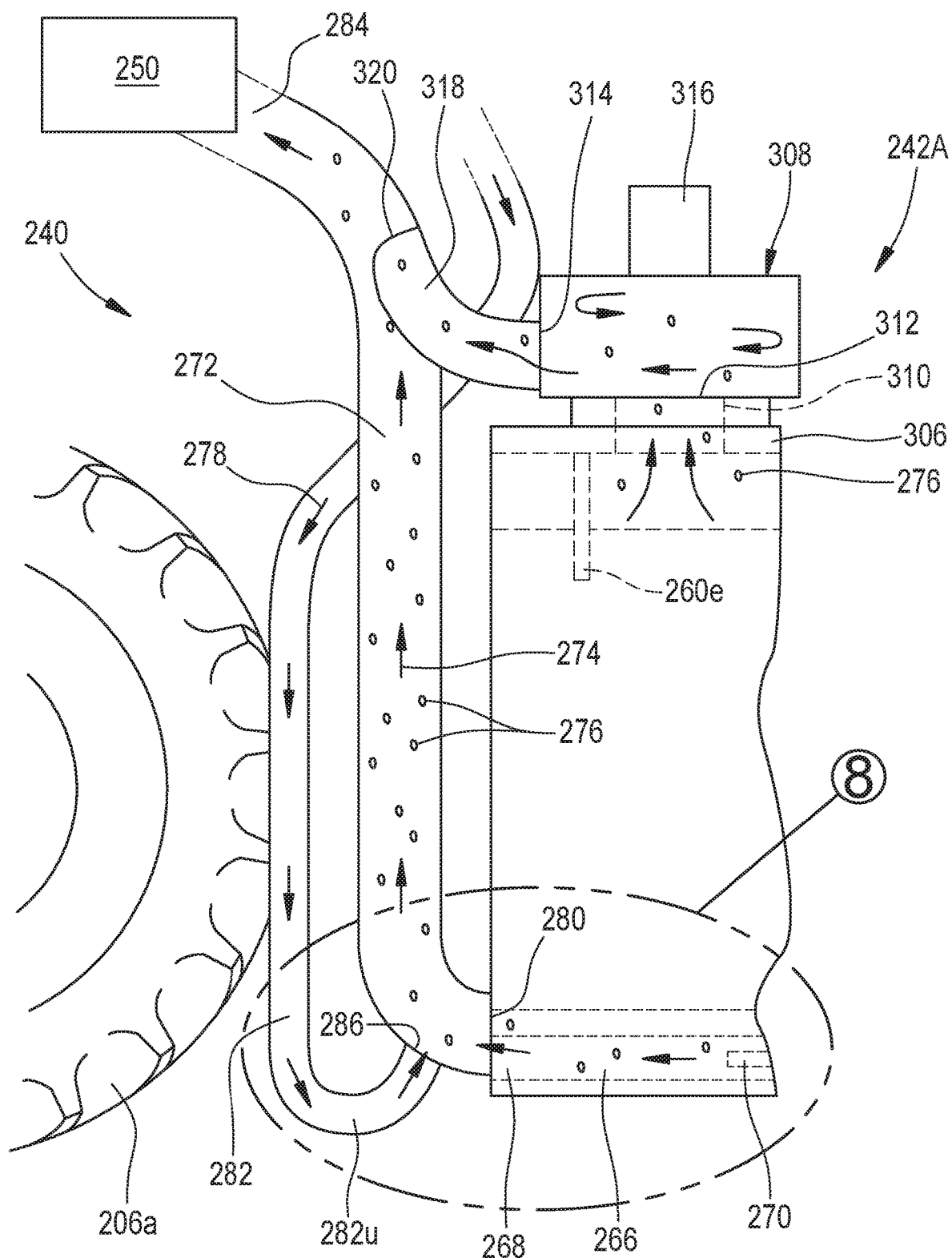
FIG. 6A is a side view of another example of a seed transport system of the exemplary seed harvester in FIG. 3A.

Referring now to FIGS. 6 and 6A, seed transport system 240 is illustrated from a side view in accordance with various embodiments of the present disclosure. Included in Detail 8 is a transparent view of a side of a header which illustrates rear portion 268 of a collection reservoir 266 and a blower 270. Arrows 274 may generally illustrate a path of seeds 276 as they are transported via seed transport system 240, while arrows 278 may generally illustrate a flow of pressurized gas used to transport seeds 276. Seed transport system 240 may comprise a plurality of feed ducts 272 configured to transport seeds 276 from the collection reservoirs to the seed isolation system. In various embodiments, each feed duct in plurality of feed ducts 272 may be coupled to a different seed collection reservoir. As such, in various embodiments, seed harvester 200 may comprise eight feed ducts coupled to eight seed collection reservoirs, however, as previously discussed, seed harvester 200 is not limited in this regard and may comprise any suitable number of seed collection reservoirs and/or feed ducts. In various embodiments, blower 270 may move collected seeds to rear portion 268 of collection reservoir 266 near an inlet 280 of each feed duct 272.

Each feed duct 272 may be equipped with a negative pressure source and/or a positive pressure source operable to generate pressurized gas flow in order to transport collected seeds from the collection reservoir to the seed isolation system. For example, in various embodiments, each feed duct 272 may comprise a vacuum source which may function to "pull" collected seeds through inlet 280 of each feed duct 272. However, the negative pressure source may be insufficient to transport the seeds through the entire length of the feed duct. Instead, the negative pressure source may be configured to move the seeds through a portion of the feed duct where a positive pressure source may move the seeds the remaining length. Accordingly, the positive pressure source may "push" collected seeds to the seed isolation system 250. For example, in various embodiments, a pump duct 282 may be coupled to feed duct 272 and configured to deliver a pressurized fluid to the feed duct to "push" seeds 276 through the feed duct 272 and to seed isolation system 250.

In various embodiments, a flow rate along feed ducts 272 between inlet 280 and an outlet 284, where seeds 276 may exit into seed isolation system 250, may be within a range of approximately 100 to 300 ft$^3$/min, or preferably within a range of approximately 125 to 275 ft$^3$/min, and more preferably approximately 260 ft$^3$/min. Such a flow rate may be sufficient to transport seeds 276 from collection reservoir 266 to seed isolation system 250, while not too great such that seeds 276 are expelled into seed isolation system 250 at a velocity in which the seeds may not be adequately separated from the waste material. In various embodiments, pump duct 282 may comprise a diameter within a range of approximately 1 to 6 inches, or preferably within a range of approximately 2 to 5 inches, or more preferably approximately 3 inches. Feed duct 272 may comprises a diameter within a range of approximately 1 to 12 inches, or preferably within a range of approximately 3 to 9 inches, or more preferably approximately 6 inches.

In various embodiments, the negative pressure source and/or positive pressure source may be generated from other portions of seed harvester 200. For example, a fan in the engine of seed harvester 200 may provide positive pressure through pump duct 282 such that seed harvester 200 need not rely on other systems for creation of the pressure differential. In various embodiments, each pump duct 282 may comprise a pump duct outlet 286 which may be coupled to feed duct 272. For example, each pump duct 282 can, optionally, comprise a substantially U-shaped portion 282*u* such that pump duct outlet 286 is oriented transverse (e.g., approximately perpendicular) to a ground surface. Such a configuration may result in an efficient transfer of gas flow and/or energy from pump duct 282 to seeds 276 moving through feed duct 272. While illustrated in FIGS. 6, 6A and 8 as comprising a substantially U-shaped portion, pump duct 282 is not limited in this regard and may comprise any suitable shape with pump duct outlet 286 being oriented at any suitable angle. In various embodiments, pump duct 282 may be brazed, welded, or otherwise coupled to feed duct 272. Moreover, feed duct 272 and/or pump duct 282 may comprise any suitable material, for example, any suitable metal alloy or polymer material.

Figure 7:
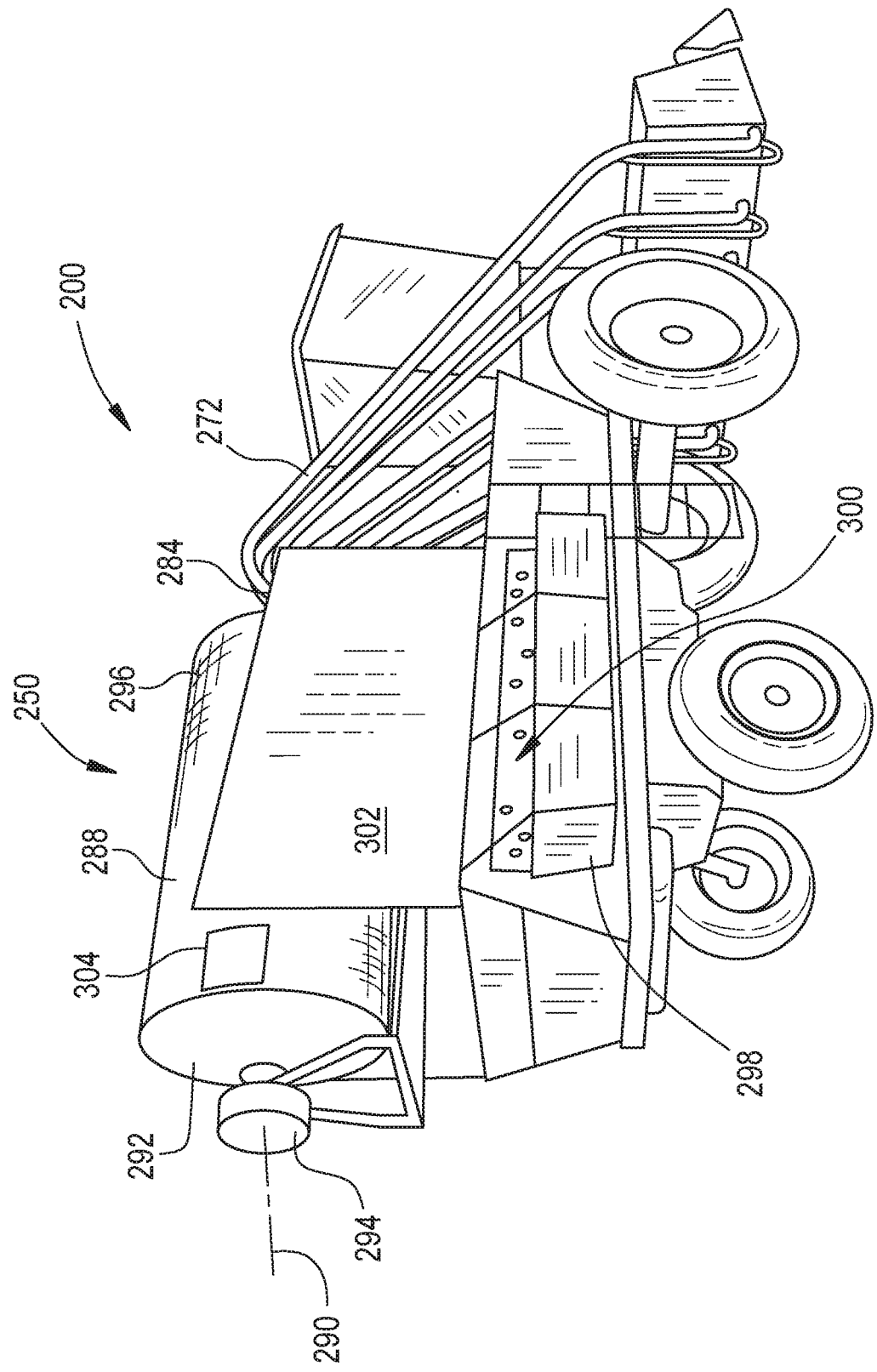
FIG. 7 is a rear perspective view the exemplary seed harvesters FIGS. 1-3, 3A, 4-6 and 6A; and, FIG. 8 is an enlarged view of the portion of the exemplary seed transport systems in FIGS. 6 and 6A identified as Detail 8 therein.

Referring now to FIG. 7, seed harvester 200 is illustrated from a rear perspective view in accordance with various embodiments of the present disclosure. As indicated above, seed harvester 200 may comprise seed isolation system 250, which can include any suitable structure configured to separate seeds from a waste material collected during the harvesting process. For example, in various embodiments, seed isolation system 250 may comprise a tumbler 288 configured to receive seeds and the waste material via outlets 284 of feed ducts 272. In various embodiments, tumbler 288 may comprise a substantially cylindrical structure configured to rotate about a central longitudinal axis 290 to expel seeds and waste. Central longitudinal axis 290 may extend along a longitudinal length of tumbler 288 at an angle relative to a ground surface. For example, central longitudinal axis 290 may be situated at an angle within a range of approximately 0 to 15 degrees relative to a ground surface such that seeds and waste material entering tumbler 288 are moved via force of gravity toward a rear portion 292 of tumbler 288. In various embodiments, rotation of tumbler 288 may be automated via a hydraulic motor 294 coupled to tumbler 288. Hydraulic motor 294 can be communicatively coupled with controller CTL such that tumbler 288 can be selectively operated and/or otherwise controlled automatically and/or by an associated operator. In some cases, the direction of rotation (i.e., clockwise, counterclockwise) about central longitudinal axis 290 can be changed from time-to-time (e.g., at the end of each pass through a field of plants) either automatically or by the associated operator, such as to more evenly distribute isolated seeds within holding containers along both sides of the seed harvester, for example.

In various embodiments, tumbler 288 may comprise a separator surface 296 on a radially outer surface of tumbler 288. Separator surface 296 may comprise a plurality of apertures configured to allow seeds to exit tumbler 288 as tumbler 288 rotates. For example, in various embodiments, separator surface 296 may comprise octagon apertures comprising a largest dimension within a range of approximately 0.01 to 1 inch, or preferably within a range of approximately 0.1 to 0.5 inch, or more preferably approximately 0.25 inch. Such a size may be sufficient to allow seeds, such as guayule seeds, comprising an average diameter of approximately 0.25" to exit tumbler 288, while not allowing waste materials to also exit tumbler 288 through separator surface 296. While discussed with reference to octagon apertures, separator surface 296 is not limited in this regard and may comprise square, rectangular, oval, or other shaped apertures of any desired size.

Seeds expelled through separator surface 296 may be configured to be collected on one or more holding containers 298 coupled to seed harvester 200 beneath tumbler 288. For example, in various embodiments, holding containers 298 may comprise a total of six polymer containers with having an opening configured to receive expelled seeds. In various embodiments, holding containers 298 may be situated beneath a seed gap 300 formed between holding containers and one or more containment walls 302 on either side of tumbler 288. As seeds are expelled through separator surface 296, the seeds may contact containment walls 302 and be redirected toward seed gap 300 and into holding containers 298. As such, containment walls 302 may prevent seeds from falling to the ground. In various embodiments, containment walls 302 may comprise sheet metal having a relatively small thickness to reduce added weight to seed harvester 200.

In various embodiments, rear portion 292 of tumbler 288 may be devoid of separator surface 296 on a radially outer surface. For example, in various embodiments, rear portion 292 may comprise a solid radially outer surface comprising one or more openings 304. Rear portion 292 may be configured to receive waste and expel waste through openings 304 out a rear portion of seed harvester 200. For example, as tumbler continues to rotate on an angle, seeds and waste material may slowly move toward rear portion 292. As seeds contact separator surface 296, the seeds may be expelled from tumbler 288 through apertures into holding containers 298. The waste material, typically comprises an area larger than the apertures in separator surface 296 may not be expelled from tumbler 288 but may move toward rear portion 292. Upon reaching rear portion 292, the waste material may be expelled through opening 304 in tumbler 288. In various embodiments, openings 304 may comprise an area of approximately 12"×12". In various embodiments, openings 304 may comprise two square-shaped openings, however, openings 304 are not limited in this regard and may comprise any number of openings shaped in any suitable manner. The waste material may be collected in a collection apparatus coupled to a rear portion of the seed harvester.

With reference, now, to FIGS. 3A and 6A, headers 242A are shown in greater detail. It will be appreciated that headers 242A can include some or all of the components and features shown and described herein with respect to headers 242. Additionally, or in the alternative to one or more components and/or features of headers 242, headers 242A can include a collection shroud 306 supported on or along header mount 244, such between first and second sidewalls 254 and 256, for example. Collection shrouds 306 can be of any suitable shape or configuration. In the exemplary arrangement in FIGS. 3A and 6A, for example, collection shrouds 306 are shown as having a curved or arcuate shape or profile. It will be appreciated, however, that other configurations could alternately be used without departing from the subject matter of the present disclosure. One or more of dislodging members 260 can be supported on or along collection shroud 306 and can extend into pass-through opening 258. For example, a dislodging member 260*e* is supported on or along collection shroud 306 and is shown as having a curved or arcuate shape or profile. It will be appreciated that dislodging member 260*e* can be used in connection with any combination of one or more of dislodging members 260*a*, 260*b*, 260*c* and/or 260*d*, such as have been described above. As such, pass-through opening 258 of headers 242A will have a shape corresponding to or otherwise at least partially defined by dislodging members 260e together with any one or more dislodging members 260a, 260b, 260c and/or 260d that are included.

It will be appreciated that dislodging member 260e is disposed in a location that is well suited for dislodging seeds from along the top of plants 262. In some cases, seeds 276 dislodged by dislodging member 260e may fall into one of collection reservoirs 266a or 266b and be drawn into seed collection system 230 in the manner discussed above. In other cases, it may be desirable to draw the dislodged seeds into the seed collection system from along collection shroud 306, such as to minimize or at least reduce the quantity of seeds lost from falling deeper into the plant and/or onto the ground. As such, headers 242A can include a fan or blower 308 disposed in fluid communication with pass-through opening 258, such as by way of a passage 310 extending through collection shroud 306. It will be appreciated that fans 308 can be of any suitable type, kind and/or construction, such as a cyclonic fan or blower with an inlet 312 disposed in fluid communication with passage 310 and a radially-outward exhaust 314 oriented transverse to inlet 312. Fans 308 can be driven by a hydraulic motor 316 that is fluidically connected with a hydraulic system of seed harvester 200 and communicatively coupled with controller CTL for selective operation of fans 308. Operation of fan 308 draws dislodged seeds 276 from toward the top of plants 262 into passage 310 and exhausts the seeds into feed ducts 272 through connector ducts 318 that are fluidically connected to the feed ducts in a suitable manner, such as by way of a flowed-material joint 320, for example.

Figure 8:
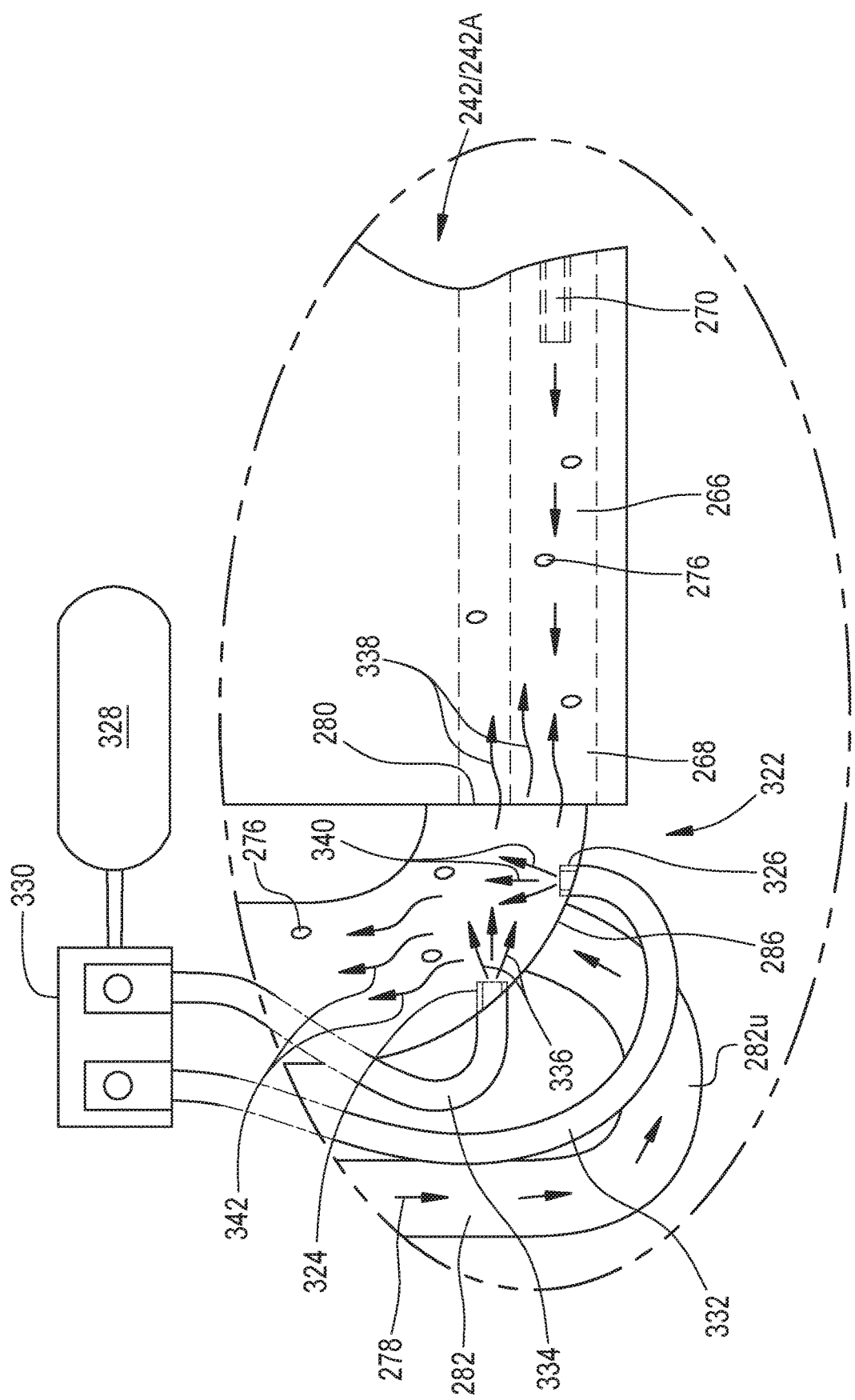

With reference, now, to FIG. 8, seed transport system 240 can, optionally, include blockage clearance system 322 that is operatively connected with collection reservoirs 266a and 266b as well as feed ducts 272 and inlets 280 thereof. Blockage clearance system 322 can include nozzles 324 and 326 that are supported on or along feed duct 272 and/or pump duct 282 in a suitable manner, such as by way of flowed-material joints, for example. Nozzle 324 is positioned in approximate alignment with inlet 280 of feed ducts 272, and nozzle 326 is oriented transverse to nozzle 324. Blockage clearance system 322 can also include a pressurized gas source 328, such as a pressurized gas storage tank, for example, and a control device 330 that is disposed in fluid communication with the pressurized gas source. Control device 330 is disposed in fluid communication with nozzles 324 and 326, such as by way of tubes 332 and 334, for example.

Nozzles 324 and 326 can be selectively operated to aid in clearing debris and blockages from the collection reservoirs and/or the feed ducts, particularly along the inlets thereof. In some cases, the nozzles can be operated such that pressurized gas is exhausted therefrom simultaneously. In other cases, the nozzles can be operated such that pressurized gas is released therefrom in a sequential manner or with a pattern of operation. In any case, control device 330 can be communicatively coupled with controller CTL of cab 208 for an associated operator to selectively release pressurized gas from pressurized gas source 328 through nozzle 324, through nozzle 326, and/or through both of nozzles 324 and 326 either simultaneously or sequentially. As non-limiting examples, pressurized gas can be provided by pressurized gas source 328 at a pressure within a range of approximately 120-160 pounds per square inch, and control device 330 can release pressurized gas through nozzles 324 and/or 326 at the same or different pressures within a range of approximately 60-160 pounds per square inch. During use, pressurized gas released from nozzle 324 is represented by arrows 336 is directed toward and through inlets 280, as is represented by arrows 338. Additionally, or in the alternative, pressurized gas released from nozzle 326 is represented by arrows 340 and is directed along feed ducts 272 in a direction toward seed isolation system 250, as is represented by arrows 342.

The seed harvester described herein may be configured to efficiently harvest seeds from a plurality of rows of plants, for example, a plurality of rows of guayule plants, in a manner that results in minimal damage to the underlying plant while maximizing the number of seeds capable of being harvested. In various embodiments, the seed harvester herein may be capable of harvesting approximately 2 acres/hr. Moreover, the seed harvester disclosed herein may be configured to begin the seed isolation and cleaning process before returning to a processing facility thereby further reducing the time required to fully process the harvested seeds.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and subcombinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method of harvesting seeds from a living and rooted plant utilizing a seed harvester, the method comprising:
   receiving the living and rooted plant within a pass-through opening of a seed dislodging system on the seed harvester and within a slot disposed between first and second collection reservoirs of a seed collection system, the pass-through opening having a height and a width with a plurality of dislodging members disposed within the pass-through opening, the plurality of dislodging members including a first dislodging member extending in a heightwise direction along a first side of the pass-through opening, a second dislodging member extending in the heightwise direction and spaced apart from the first dislodging member in a widthwise direction along a second side of the pass-through opening opposite the first side, and a third dislodging member extending in the widthwise direction and across a top of the pass-through opening with the first and second collection reservoirs disposed along a bottom of the pass-through opening such that the living and rooted plant passes through the slot and the pass-through opening as the seed harvester moves along a row of living and rooted plants;
   contacting the living and rooted plant with the dislodging members of the seed dislodging system on the seed harvester and thereby dislodging the seeds from the living and rooted plant in a nondestructive manner such that the plant remains living and rooted after the seeds have been dislodged;
   collecting the seeds via the seed collection system on the seed harvester with one or more of the seeds falling into at least one of the first and second collection reservoirs and generating pressurized gas flow drawing one or more of the seeds upwardly from a top of the living and rooted plant into the seed collection system through a passage disposed along the top of the pass-through opening adjacent the third dislodging member;
   transporting the seeds via a seed transport system on the seed harvester from the seed collection system to a seed isolation system on the seed harvester; and,
   isolating the seeds from a waste material via the seed isolation system.

2. A method according to claim 1, wherein contacting the living and rooted plant with the dislodging member includes causing the seeds to fall from the living and rooted plant via force of gravity to the seed collection system.

3. A method according to claim 1, wherein collecting the seed includes positioning the first and second collection reservoirs beneath a portion of the living and rooted plant prior to contacting the living and rooted plant with one of the dislodging members.

4. A method according to claim 1, wherein transporting the seeds includes generating pressurized gas flow along the seed collection system thereby moving the seeds in the pressurized gas flow toward the seed transport system.

5. A method according to claim 1, wherein transporting the seeds includes generating pressurized gas flow along a feed duct of the seed transport system thereby moving the seeds in the pressurized gas flow through the feed duct from the seed collection system to the seed isolation system.

6. A method according to claim 1, wherein isolating the seeds from the waste material includes tumbling the seeds and the waste material in a tumbler of the seed isolation system that includes a separator surface and an opening with the seeds exiting the tumbler through the separator surface and the waste material exiting the tumbler through the opening.

7. A seed harvesting header for a seed harvester, the seed harvesting header operable to dislodge associated seeds from an associated row of associated living and rooted plants, the seed harvesting header comprising:
   a first sidewall and a second sidewall opposite the first sidewall such that a pass-through opening is at least partially defined therebetween, the first sidewall positionable along an associated first side of the associated row of associated living and rooted plants and the second sidewall positionable along an associated second side of the associated row of the associated living and rooted plants such that the associated row of associated living and rooted plants travels through the pass-through opening during travel of the seed harvesting header;

a collection shroud extending in a widthwise direction between the first and second sidewalls and across a top of the pass-through opening, the collection shroud including a passage extending therethrough in fluid communication with the pass-through opening;

a first dislodging member extending in a heightwise direction, the first dislodging member supported along the first sidewall and extending into the pass-through opening from along the first sidewall a distance sufficient to contact the associated living and rooted plants along the first side of the associated row thereof;

a second dislodging member extending in the heightwise direction, the second dislodging member supported along the second sidewall and extend into the pass-through opening from along the second sidewall a distance sufficient to contact the associated living and rooted plants along the second side of the associated row thereof;

a third dislodging member extending in the widthwise direction, the third dislodging member supported across the top of the pass-through opening and extending into the pass-through opening a distance sufficient to contact the associated living and rooted plants along a top of the associated row thereof;

a collection reservoir beneath at least one of the first dislodging member and the second dislodging member; and, an air pressure source in fluid communication with the passage in the collection shroud and operable to draw dislodged seeds into the passage from along a top portion of an associated living and rooted plant during use of the seed harvesting header.

8. A seed harvesting header according to claim 7, wherein the third dislodging member is supported on the collection shroud.

9. A seed harvesting header according to claim 7, wherein the first and second dislodging members include stationary flexible bristles configured to contact the associated living and rooted plant and dislodge an associated seed from the associated living and rooted plant.

10. A seed harvesting header according to claim 7, wherein the collection reservoir includes a substantially U-shaped elongated channel configured to receive an associated dislodged seed.

11. A seed harvesting header according to claim 7, wherein the header is configured to be rotatably mounted to a front end of the seed harvester via a header mount.

12. A seed harvesting header according to claim 7 further comprising a guide wheel extending from beneath the header and configured to support the header.

13. A seed harvesting header according to claim 7 further comprising a guide wedge configured to guide the associated living and rooted plant into the pass-through opening.

14. A seed harvesting header according to claim 7, wherein the collection reservoir further includes a blower coupled along at least one of the first sidewall and the second sidewall, the blower configured to move an associated dislodged seed to a rear portion of the collection reservoir.

15. A seed harvester comprising:

a plurality of headers coupled to the seed harvester with at least one of the plurality of headers including:

a seed dislodging system including a pass-through opening dimensioned to receive an associated plant, the seed dislodging system configured to dislodge an associated seed from the associated plant as the associated plant passes through the pass-through opening; and, a seed collection system disposed in communication with the seed dislodging system, the seed collection system configured to collect the associated seed dislodged from the associated plant via the seed dislodging system; and, a seed transport system in communication with the seed collection system and operable to transport the associated dislodged seed out of the seed collection system and into a feed duct in communication with the seed collection system through an inlet, a pump duct coupled to the feed duct and configured to assist in transporting the associated dislodged seed through the feed duct utilizing a positive pressure source, and a blockage clearance system including a nozzle disposed in fluid communication with the feed duct adjacent inlet, the blockage clearance system operable to selectively deliver pressurized gas to the nozzle.

16. A seed harvester according to claim 15, wherein the plurality of headers includes a first dislodging member, a first sidewall, a second dislodging member, a second sidewall opposite the first sidewall, and a collection reservoir coupled to at least one of the first sidewall and the second sidewall.

17. A seed harvester according to claim 15 further comprising a seed isolation system in communication with the seed transport system and configured to isolate the associated dislodged seed from a waste material.

18. A seed harvester according to claim 15, wherein the seed transport system includes a blower coupled to one of the first sidewall and the second sidewall and configured to move the associated dislodged seed to a rear portion of the collection reservoir and a feed duct configured to receive the associated dislodged seed from the collection reservoir and transport the associated dislodged seed to the seed isolation system.

19. A seed harvester according to claim 15, wherein the positive pressure source is a fan of an engine on the seed harvester.

20. A seed harvester according to claim 15, wherein the seed collection system includes a collection reservoir beneath at least a portion of the seed dislodging system.

* * * * *